(12) United States Patent
Domínguez Puente et al.

(10) Patent No.: US 12,486,279 B2
(45) Date of Patent: Dec. 2, 2025

(54) INDOLE ALKALOID WITH FUNGICIDAL EFFECT

(71) Applicant: AZUL NATURAL S.A. DE C.V., Durango (MX)

(72) Inventors: Jesús Alejandro Domínguez Puente, Durango (MX); José Manuel Narvaez Mastache, Durango (MX); Rosa Laura Andrade Melchor, Corregidora (MX)

(73) Assignee: AZUL NATURAL S.A. DE C.V., Durango (MX)

( * ) Notice: Subject to any disclaimer, the term of this patent is extended or adjusted under 35 U.S.C. 154(b) by 358 days.

(21) Appl. No.: 18/018,393

(22) PCT Filed: Apr. 30, 2021

(86) PCT No.: PCT/MX2021/050021
§ 371 (c)(1),
(2) Date: Jan. 27, 2023

(87) PCT Pub. No.: WO2022/025744
PCT Pub. Date: Feb. 3, 2022

(65) Prior Publication Data
US 2023/0279022 A1 Sep. 7, 2023

(30) Foreign Application Priority Data
Jul. 27, 2020 (MX) .................... MX/a/2020/007930

(51) Int. Cl.
*C07D 491/048* (2006.01)
*A01P 3/00* (2006.01)

(52) U.S. Cl.
CPC ............ *C07D 491/048* (2013.01); *A01P 3/00* (2021.08)

(58) Field of Classification Search
CPC ................................ C07D 491/048; A01P 3/00
USPC ........................................................ 514/410
See application file for complete search history.

(56) References Cited

FOREIGN PATENT DOCUMENTS

| CN | 102093357 A | 6/2011 |
|----|-------------|--------|
| CN | 105695368 A | 6/2016 |
| CN | 105733986 A | 7/2016 |
| WO | 2014028521 A1 | 2/2014 |

OTHER PUBLICATIONS

Morales-Rios et al., "Efficient Formal Total Synthesis of Physostigmine and Physovenine: Conformational Analysis of Key Intermediates1", Journal of Natural Products, 2002, pp. 136-141, vol. 65.
Loyola-Vargas et al., "Biosíntesis de los alcaloides indólicos. Una revisión crítica", Revista de la Sociedad Química de Mexico, 2004, pp. 67-94, vol. 48.—English-language abstract.
Dennis et al., "Pesticide Use and Cutaneous Melanoma in Pesticide Applicators in the Agricultural Heath Study", Environmental Health Perspectives, 2010, pp. 812-817, vol. 118, No. 6.
Mcmahon et al., "The Fungicide Chlorothalonil Is Nonlinearly Associated with Corticosterone Levels, Immunity, and Mortality in Amphibians", Environmental Health Perspectives, 2011, pp. 1098-1103, vol. 119, No. 8.
Van Wendel De Joode et al., "Aerial Application of Mancozeb and Urinary Ethylene Thiourea (ETU) Concentrations among Pregnant Women in Costa Rica: The Infants' Environmental Health Study (ISA)", Environmental Health Perspectives, 2014, pp. 1321-1328, vol. 122, No. 12.
Ito et al., "Tert-Butyl Iodide Mediated Reductive Fischer Indolization of Conjugated Hydrazones", Chemistry—A European Journal, 2016, pp. 2616-2619, vol. 22:8.
Li et al., "Isolation and evaluation of endophytic Bacillus tequilensis GYLH001 with potential application for biological control of Magnaporthe oryzae", 2018, PLOS One, pp. 1-18, vol. 13, No. 10.
Tran et al., "Control of Ceratocystis manginecans causing wilt disease on Acacia mangium seedlings", Australian Plant Pathology, 2018, pp. 579-586, vol. 47.
Bhattacharya et al., "Intervention of bio-protective endophyte Bacillus tequilensis enhance physiological strength of tomato during Fusarium wilt infection", Biological Control, 2019, pp. vol. 139.
Du et al., "Screening for antagonistic bacteria against Fusarium oxysporum and their influence on the consecutive monoculture problem of Rehmannia glutinosa", Journal of Plant Pathology, 2020, pp. 489-497, vol. 102.

*Primary Examiner* — Kristin A Vajda
(74) *Attorney, Agent, or Firm* — The Webb Law Firm

(57) ABSTRACT

Provided herein is a compound of formula I, which has a marked fungicidal effect against phytopathogenic fungi, which infest commercial crops; likewise, the present invention provides fungicidal compositions comprising the compound of formula I and a method for its synthesis.

Figure 1:
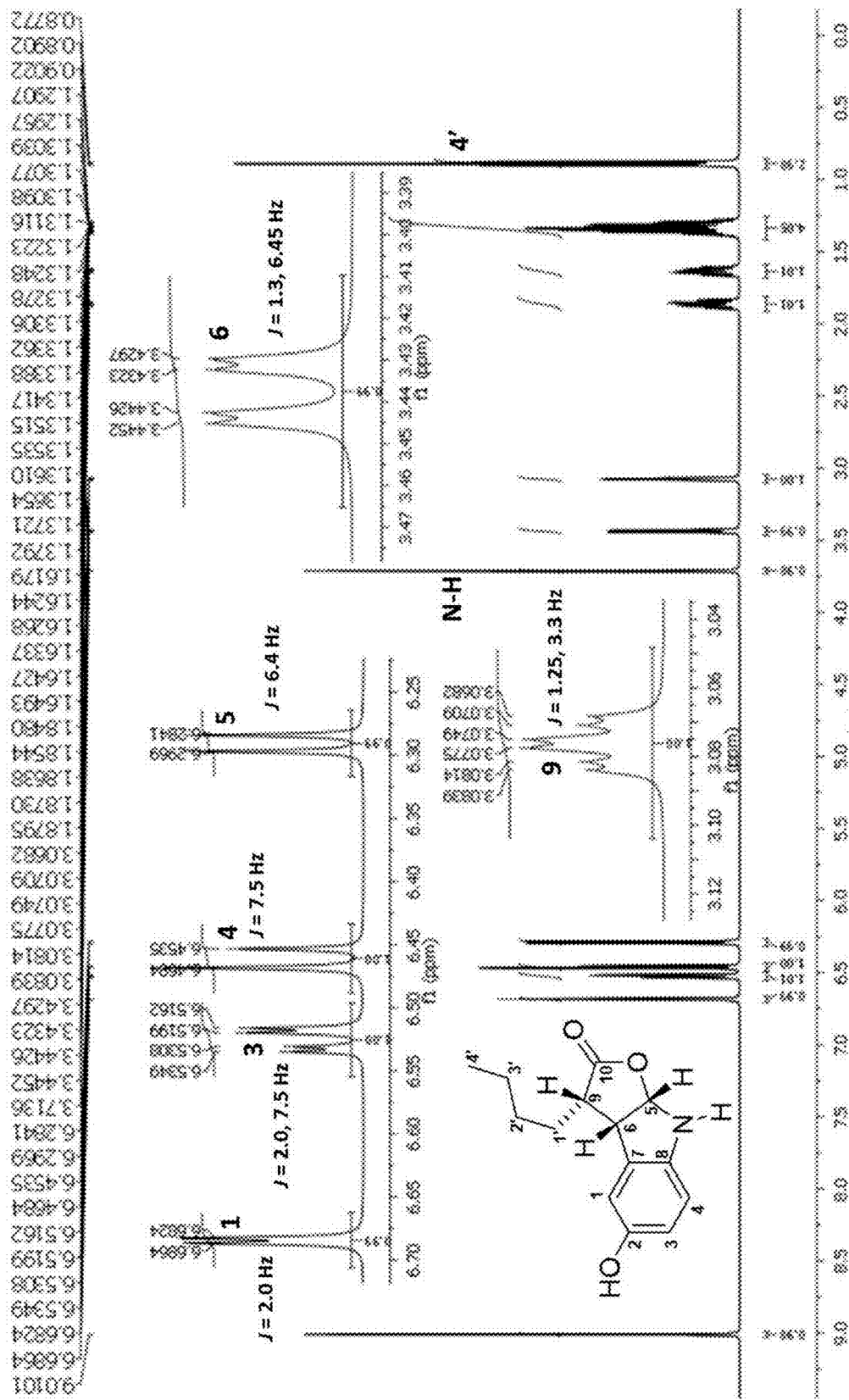

19 Claims, 7 Drawing Sheets
Specification includes a Sequence Listing.

SEQUENCE LISTING

```
<160> NUMBER OF SEQ ID NOS: 2

<210> SEQ ID NO 1
<211> LENGTH: 1422
<212> TYPE: DNA
<213> ORGANISM: Bacillus tequilensis

<400> SEQUENCE: 1
tgcagtcgag cggacagatg ggagcttgct ccctgatgtt agcggcggac gggtgagtaa      60
cacgtgggta acctgcctgt aagactggga taactccggg aaaccggggc taataccgga     120
tggttgtttg aaccgcatgg ttcaaacata aaaggtggct tcggctacca cttacagatg     180
gacccgcggc gcattagcta gttggtgagg taacggctca ccaaggcaac gatgcgtagc     240
cgacctgaga gggtgatcgg ccacactggg actgagacac ggcccagact cctacggag      300
gcagcagtag ggaatcttcc gcaatggacg aaagtctgac ggagcaacgc cgcgtgagtg     360
atgaaggttt tcggatcgta aagctctgtt gttagggaag aacaagtacc gttcgaatag     420
ggcggtacct tgacggtacc taaccagaaa gccacggcta actacgtgcc agcagccgcg     480
gtaatacgta ggtggcaagc gttgtccgga attattgggc gtaaagggct cgcaggcggt     540
ttcttaagtc tgatgtgaaa gccccggct caaccgggga gggtcattgg aaactgggga     600
acttgagtgc agaagaggag agtggaattc cacgtgtagc ggtgaaatgc gtagagatgt     660
ggaggaacac cagtggcgaa ggcgactctc tggtctgtaa ctgacgctga agagcgaaag     720
cgtggggagc gaacaggatt agatacctg gtagtccacg ccgtaaacga tgagtgctaa     780
gtgttagggg gtttccgccc cttagtgctg cagctaacgc attaagcact ccgcctgggg     840
agtacggtcg caagactgaa actcaaagga attgacgggg gcccgcacaa gcggtggagc     900
atgtggttta attcgaagca acgcgaagaa ccttaccagg tcttgacatc ctctgacaat     960
cctagagata ggacgtcccc ttcggggca gagtgacagg tggtgcatgg ttgtcgtcag    1020
ctcgtgtcgt gagatgttgg gttaagtccc gcaacgagcg caacccttga tcttagttgc    1080
cagcattcag ttgggcactc taaggtgact gccggtgaca aaccggagga aggtggggat    1140
gacgtcaaat catcatgccc cttatgacct gggctacaca cgtgctacaa tggacagaac    1200
aaagggcagc gaaaccgcga ggttaagcca atcccacaaa tctgttctca gttcggatcg    1260
cagtctgcaa ctcgactgcg tgaagctgga atcgctagta atcgcggatc agcatgccgc    1320
ggtgaatacg ttcccgggcc ttgtacacac cgcccgtcac accacgagag tttgtaacac    1380
ccgaagtcgg tgaggtaacc tttaggagcc agccgccgaa gg                       1422

<210> SEQ ID NO 2
<211> LENGTH: 1542
<212> TYPE: DNA
<213> ORGANISM: Bacillus tequilensis

<400> SEQUENCE: 2
```

```
cagagtttga tcctggctca ggacgaacgc tggcggcgtg cctaatacat gcaagtcgag        60
cggacagatg ggagcttgct ccctgatgtt agcggcggac gggtgagtaa cacgtgggta       120
acctgcctgt aagactggga taactccggg aaaccggggc taataccgga tggttgtttg       180
aaccgcatgg ttcaaacata aaaggtggct tcggctacca cttacagatg gacccgcggc       240
gcattagcta gttggtgagg taacggctca ccaaggcaac gatgcgtagc cgacctgaga       300
gggtgatcgg ccacactggg actgagacac ggcccagact cctacgggag gcagcagtag       360
ggaatcttcc gcaatggacg aaagtctgac ggagcaacgc cgcgtgagtg atgaaggttt       420
tcggatcgta aagctctgtt gttagggaag aacaagtacc gttcgaatag ggcggtacct       480
tgacggtacc taaccagaaa gccacggcta actacgtgcc agcagccgcg gtaatacgta       540
ggtggcaagc gttgtccgga attattgggc gtaaagggct cgcaggcggt ttcttaagtc       600
tgatgtgaaa gcccccggct caaccgggga gggtcattgg aaactgggga acttgagtgc       660
agaagaggag agtggaattc cacgtgtagc ggtgaaatgc gtagagatgt ggaggaacac       720
cagtggcgaa ggcgactctc tggtctgtaa ctgacgctga ggagcgaaag cgtggggagc       780
gaacaggatt agataccctg gtagtccacg ccgtaaacga tgagtgctaa gtgttagggg       840
gtttccgccc cttagtgctg cagctaacgc attaagcact ccgcctgggg agtacggtcg       900
caagactgaa actcaaagga attgacgggg cccgcacaa gcggtggagc atgtggttta       960
attcgaagca acgcgaagaa ccttaccagg tcttgacatc ctctgacaat cctagagata      1020
ggacgtcccc ttcggggca gagtgacagg tggtgcatgg ttgtcgtcag ctcgtgtcgt      1080
gagatgttgg gttaagtccc gcaacgagcg caacccttga tcttagttgc cagcattcag      1140
ttgggcactc taaggtgact gccggtgaca aaccggagga aggtggggat gacgtcaaat      1200
catcatgccc cttatgacct gggctacaca cgtgctacaa tggacagaac aaagggcagc      1260
gaaaccgcga ggttaagcca atcccacaaa tctgttctca gttcggatcg cagtctgcaa      1320
ctcgactgcg tgaagctgga atcgctagta atcgcggatc agcatgccgc ggtgaatacg      1380
ttcccgggcc ttgtacacac cgcccgtcac accacgagag tttgtaacac ccgaagtcgg      1440
tgaggtaacc ttttaggagc cagccgccga aggtgggaca gatgattggg gtgaagtcgt      1500
aacaaggtag ccgtatcgga aggtgcggct ggatcacctc ct                        1542
```

INDOLE ALKALOID WITH FUNGICIDAL EFFECT

CROSS-REFERENCE TO RELATED APPLICATIONS

This application is the United States national phase of International Application No. PCT/MX2021/050021 filed Apr. 30, 2021, and claims priority to Mexican Patent Application No. MX/a/2020/007930 filed Jul. 27, 2020, the disclosures of which are hereby incorporated by reference in their entireties.

The Sequence Listing associated with this application is filed in electronic format and is hereby incorporated by reference into the specification in its entirety. The name of the text file containing the Sequence Listing is 2300438 ST25.txt. The size of the text file is 4,352 bytes, and the text file was created on Jan. 27, 2023.

OBJECT OF THE INVENTION

The present invention relates to a novel indole alkaloid with a fungicidal effect, and more particularly refers to an indole alkaloid of molecular formula I, called Andranone in the present invention and whose IUPAC name is ((3S,3aR,8aS)-3-butyl-5-hydroxy-3,3a,8a-trimethyl-3,3a,8,8a-tetrahydro-2H-furo[2,3-b]indol-2-one), which has marked inhibitory activity on the growth and development of phytopathogenic fungi. Furthermore, the present invention relates to the process for obtaining said indole alkaloid by two methods: a biotechnological process and chemical synthesis. Likewise, the present invention refers to the use of said indole alkaloid in the development of formulations with fungicidal activity, preferably liquid formulations, useful in ascomycete fungi control that affect crops of economic importance, such as black sigatoka (*Mycosphaerella fijiensis*), the main phytopathogenic organism of banana crops (*Musa×paradisiaca*).

BACKGROUND OF THE INVENTION

Crops of commercial interest are mostly monocultures in which the plants grown are organisms genetically very similar to each other. The advantage of having genetically similar organisms is that the production of plant structures is uniform, and the production of fruits and grains can be better controlled, obtaining crops with the same quality level, which is repeatable in each crop cycle. However, since the obtained plants are so similar to each other, they become more susceptible to pests, since all the organisms present in the crop will react in the same way to pathogens agents, so if a pathogen is capable of infect one plant, the other plants will be attacked in the same way. In addition, due to the proximity of the plants in commercial crops, the spread of pathogens is very rapid and there may be cases where a single affected plant contaminates the entire crop in a few hours. Therefore, it is of the utmost importance to have contingency plans to deal with infestations of the most common pathogens.

One of the most common groups of pathogens to be treated in crops are fungi, which, as infectious agents, have a very rapid and aggressive spread on crops due to their rapid growth rate and the ease with which their spores, are distributed by wind or insects. In addition, due to the way they feed, these infectious agents cause considerable damage to the crops, which quickly render them unusable, since the affected plant structures present visible damage, such as necrotic or scar tissue in large areas of the stems, leaves and fruits.

The control of phytopathogenic fungi is complex and requires the use of specialized products that can actively attack the growth of the fungus, without causing damage to the tissues of the host plant, and without harming the free-living organisms that share the environment of cultivation. To date, there are several chemical compounds that have been tested to combat fungi, such as Chlorothalonil and Mancozeb, which are two of the active ingredients present in commercial fungicides that are used more extensively in conventional agriculture.

Chlorothalonil (tetrachloro-isophthalonitrile) is a polychlorinated aromatic compound derived from chloroisophthalic acid with broad-spectrum fungicidal activity, non-systemic, and limited local translocation capacity. The products that are marketed using Chlorothalonil as an active ingredient are mostly, for foliar application, with preventive and eradicative action on numerous diseases of fungal origin. Chlorothalonil inhibits fungal cell respiration, that is, the transformation of carbohydrates into energy, by an action mechanism that involves the binding of Chlorothalonil molecules to the sulfhydryl groups of some amino acids, thus interfering with the functioning of the enzymes that control the Krebs cycle, deactivating it, so that ATP (adenosine triphosphate) is not produced; by not being able to complete cellular respiration, the fungal cells die, so it is considered that Chlorothalonil acts as a non-specific fungicide that belongs to the group of multisite inhibitors, since it increases the concentration of reactive oxygen species, such as hydroxyl ions, superoxide radical anion and hydrogen peroxide, causing high cellular oxidative stress. The general symptoms of its action on fungal cells are retardation of mycelial growth and inhibition of spore germination. Chlorothalonil, being non-specific, can damage other free-living organisms in addition to the pathogens to be treated. Moreover, due to its low specificity, it can generate the appearance of resistance in the treated organisms. Chlorothalonil has a half-life of 10 to 40 days in aerated soils and 5 to 15 days in flooded soils. In aquatic systems, this compound can bind to suspended solids and sediments, or it can be removed by chemical and biological processes. Its half-life due to biodegradation varies between 8.1 and 8.8 days in seawater, its half-life due to photolysis is equal to 65 days in surface water, and its half-life due to hydrolysis is 38.1 days in alkaline water (pH 9) but is stable to hydrolysis under acidic or neutral conditions. Its bioconcentration potential varies from low to high in aquatic organisms and it is considered highly persistent: 6-43 days. For example, in the work of McMahon T. A., et al. *The fungicide chlorothalonil is nonlinearly associated with corticosterone levels, immunity, and mortality in amphibians. Environmental health perspectives*, 2011, vol. 119, no 8, p. 1098-1103, Chlorothalonil is described as having moderate to persistent toxicity to aquatic vertebrates and invertebrates when exposed to the compound. For various fish species, the median lethal toxicity values ($LC_{50}$) found were less than 20 μg/L, for an interval of 48 to 96 h after exposure. *Daphnia magna* showed a delay in its reproduction when exposed to concentrations of 32 μg/L; while, in small fish, Chlorothalonil at concentrations of 6.5 μg/L decreased the number of eggs per spawning, the hatchability of eggs and the survival of the fry.

Mancozeb belongs to the chemical group of ethylenebisdithiocarbamates and has a multisite action mechanism in fungi. Dithiocarbamates become toxic when they are metabolized by the fungal cell in the isothiocyanate radical, which disrupts the sulfhydryl group in amino acids and fungal cell enzymes, thereby disrupting enzymatic activity; furthermore, it affects the disruption of lipid metabolism by affecting membrane permeability, or the disruption of respiration and ATP production in the fungal cell. Therefore, since Mancozeb is an inhibitor that acts on multiple processes (multisite inhibitor) regulated by several genes, multiple mutations would be necessary to develop a resistant individual. All of this hinders, and in practice prevents, the appearance of resistance in the treated pathogenic fungi, thus constituting an essential component of application programs alone or in mixed formulations with systemic fungicides. However, in several studies such as that of Dennis, L. K., et al. *Pesticide use and cutaneous melanoma in pesticide applicators in the agricultural heat study. Environmental Health Perspectives*, 2010, Vol. 118, no 6, p. 812-817, has been found that the exposure to Mancozeb significantly increases the risk of developing cutaneous melanoma in agricultural workers. On the other hand, in the Article by Van Wendel de Joode, B., et al. *Aerial application of Mancozeb and urinary ethylene thiourea (ETU) concentrations among pregnant women in Costa Rica: the Infants' Environmental Health Study (ISA). Environmental Health Perspectives*, 2014, Vol. 122, no 12, p. 1321-1328, it is described that women exposed to Mancozeb have elevated levels of ethylene thiourea in urine (ETU). ETU affects the functioning of the thyroid, therefore the concentrations of ETU in the urine of pregnant women are of concern, since they can cause alterations in fetal development.

In view of the above, it is clear that conventional fungicides, although they can be effective as control agents for phytopathogenic fungal infestations in commercial crops, have serious limitations in their use, since it has been shown that the most commonly used compounds damage to free-living organisms. In addition, compounds such as Chlorothalonil and Mancozeb have proven to have a high residuality in aquatic bodies, in addition to favoring the appearance of melanomas in humans. Likewise, the foliar application of products that use Mancozeb as active ingredient, by increasing ETU levels in pregnant women, can cause alterations in embryonic growth.

In view of the above problems, it is necessary to provide alternatives for the control of phytopathogenic fungi in commercial crops that do not affect free-living organisms. In addition, there is a need to provide new compounds with fungicidal activity, which present an action mechanism different from the available compounds, to avoid affecting the other organism metabolism and reduce health risks, for applicators and the population living near the fungi crops.

SUMMARY OF THE INVENTION

In order to overcome the limitations and adverse effects of bioactive compounds for the control of phytopathogenic agents, the present invention aims to provide a new compound based on an indole nucleus named by the inventor of the present invention as Andranone, with marked fungicidal activity, which displays its activity through a mechanism different from that of the available compounds, since it intercalates in the membranes of the spores and the mycelium of the fungus, causing cell lysis and, finally its death.

Another object of the present invention is to provide an antifungal compound with low toxicity for free-living organisms.

An additional object of the present invention is to provide biotechnological and chemical synthesis processes for obtaining the compound with fungicidal activity.

It is also an object of the present invention to provide a liquid composition with fungicidal activity that can be used to control phytopathogenic fungi safely without causing residual toxicity in plant tissues and without affecting the free-living species of the ecosystem where a crop to be treated is located.

The aforementioned as well as other objects and advantages of the present invention will become apparent from the following detailed description thereof.

DESCRIPTION OF THE FIGURES OF THE INVENTION

FIG. 1 shows the 1H-NMR spectrum of the indole alkaloid of general formula I.

Figure 2:
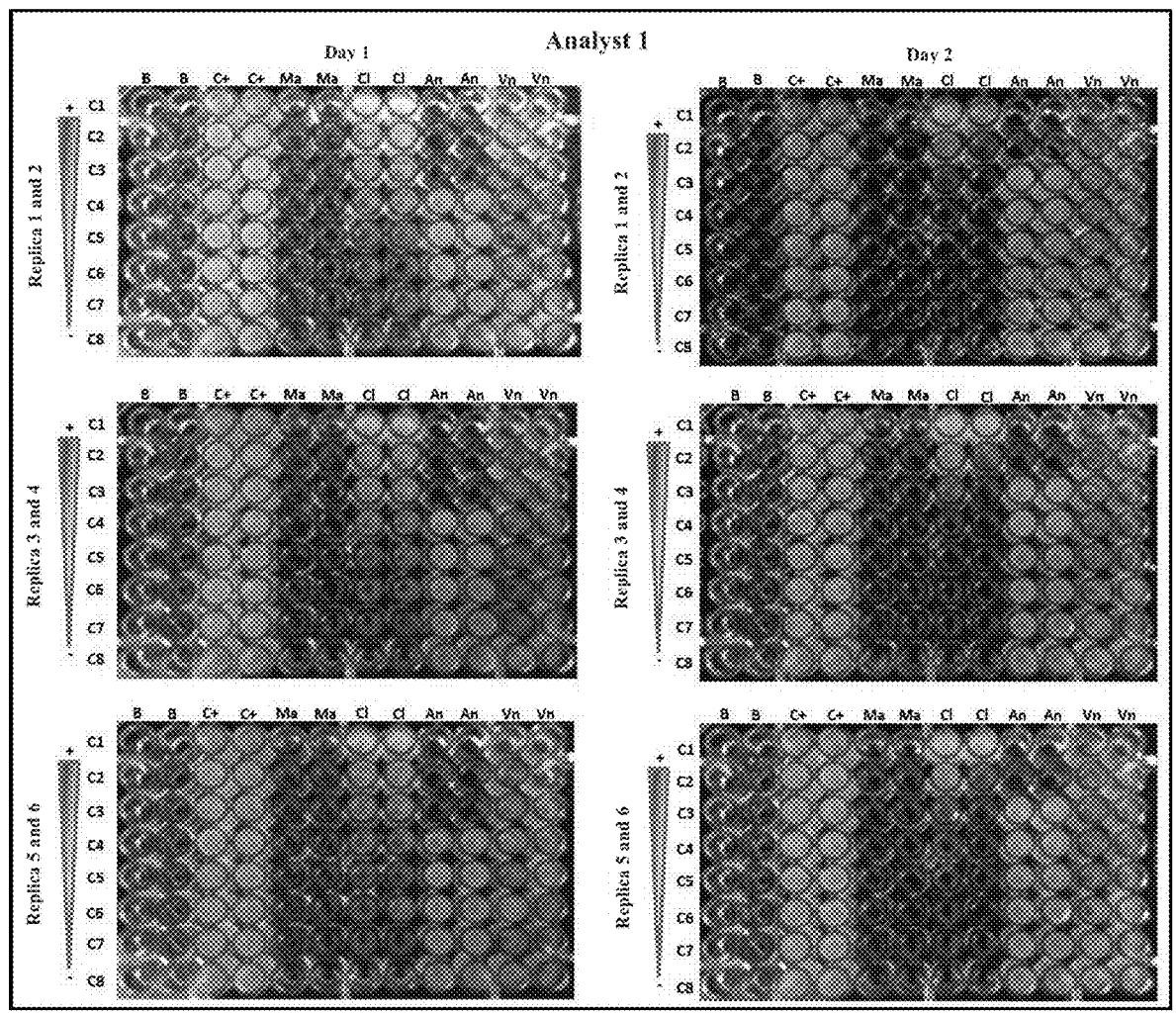

FIG. 2 shows a series of plates resulting from the determination of the minimum inhibitory concentration (MIC) of Andranone against *Colletotrichum gloeosporioides* carried out by an analyst on 2 different days. B: Negative Control (PDB: Potato dextrose broth); C+: Control (Fungus+PDB); Ma: Fungus+Mancozeb+PDB; Cl: Fungus+Chlorothalonil+PDB; An: Fungus+Andranone+PDB; [Ma]=7.81-250 mg/mL), [Cl]=7.81-250 mg/mL), [An]=62.5-1000 mg/mL and [Vn]=62.5-1000 mg/mL.

Figure 3:
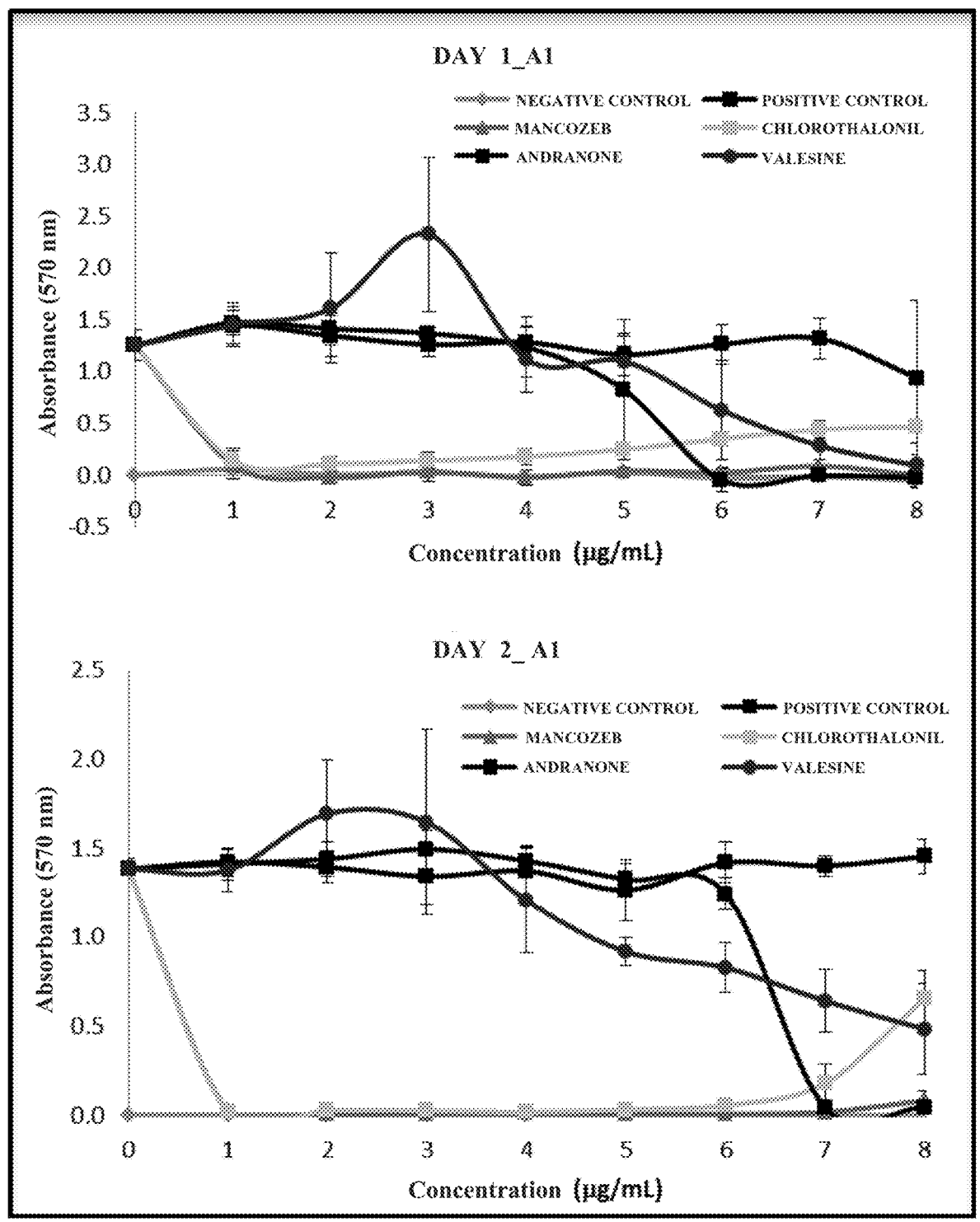

FIG. 3 shows graphs in which the correlation between the absorbance and the Andranone concentration against *Colletotrichum gloeosporioides* (Day 1 and 2, Analyst 1) is observed. 1 to 8: Concentration from lowest to highest; 0=0 mg/mL. Mancozeb and Chlorothalonil=0-250 mg/mL; Andranone. The value of each concentration represents the average of 6 technical replicates plotted with their standard deviation.

Figure 4:
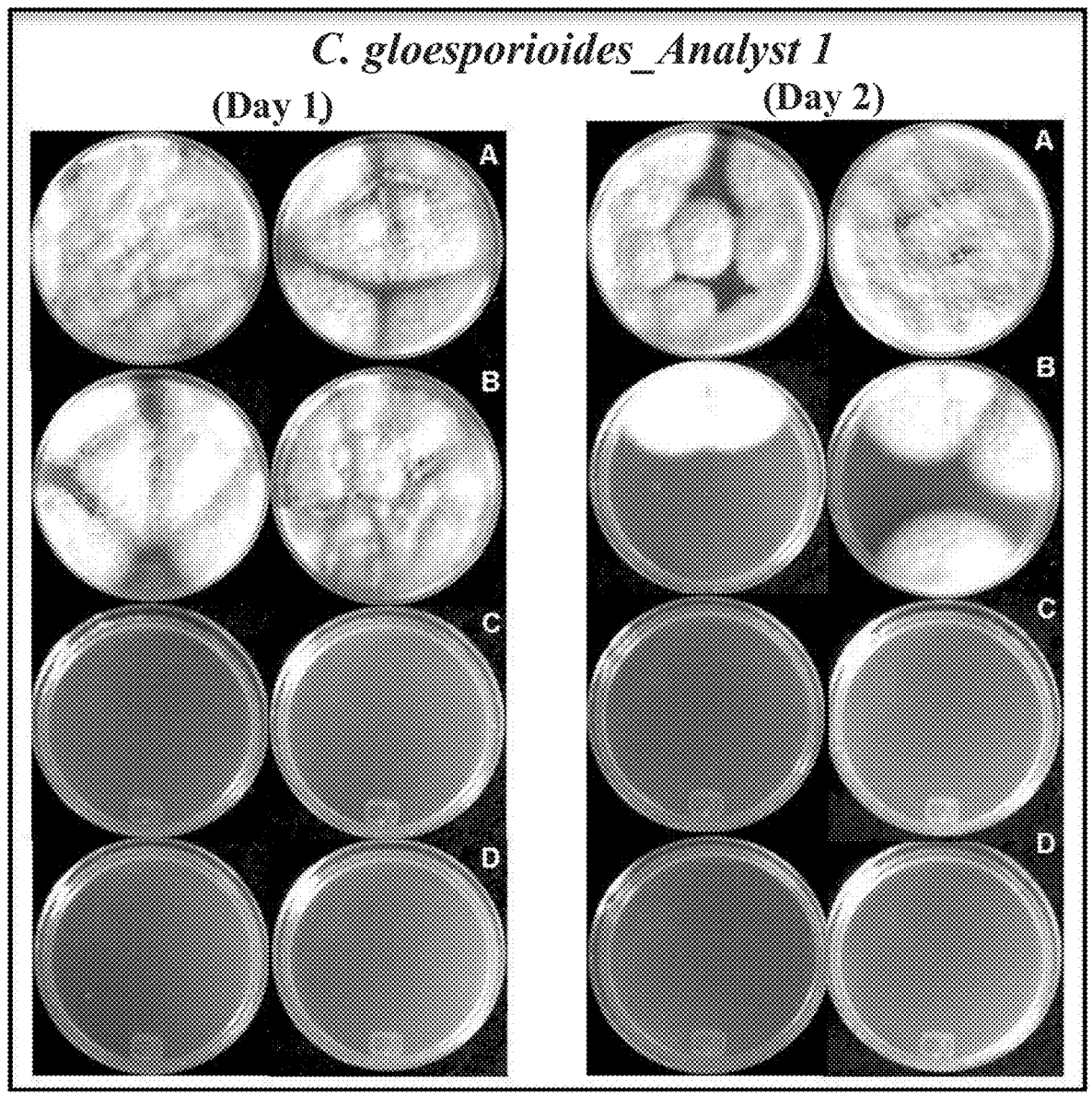

FIG. 4 shows the plates in which the colony-forming units (CFU/mL) obtained from the *Colletotrichum gloeosporioides* mycelium solution were counted by Analyst 1, Day 1 (left), Day 2 (right). A) Inoculum (50 mL); B) Dilution $10^{-1}$ (100 mL); C) Dilution $10^{-2}$ (100 mL); D) Dilution 10-4 (100 mL).

Figure 5:
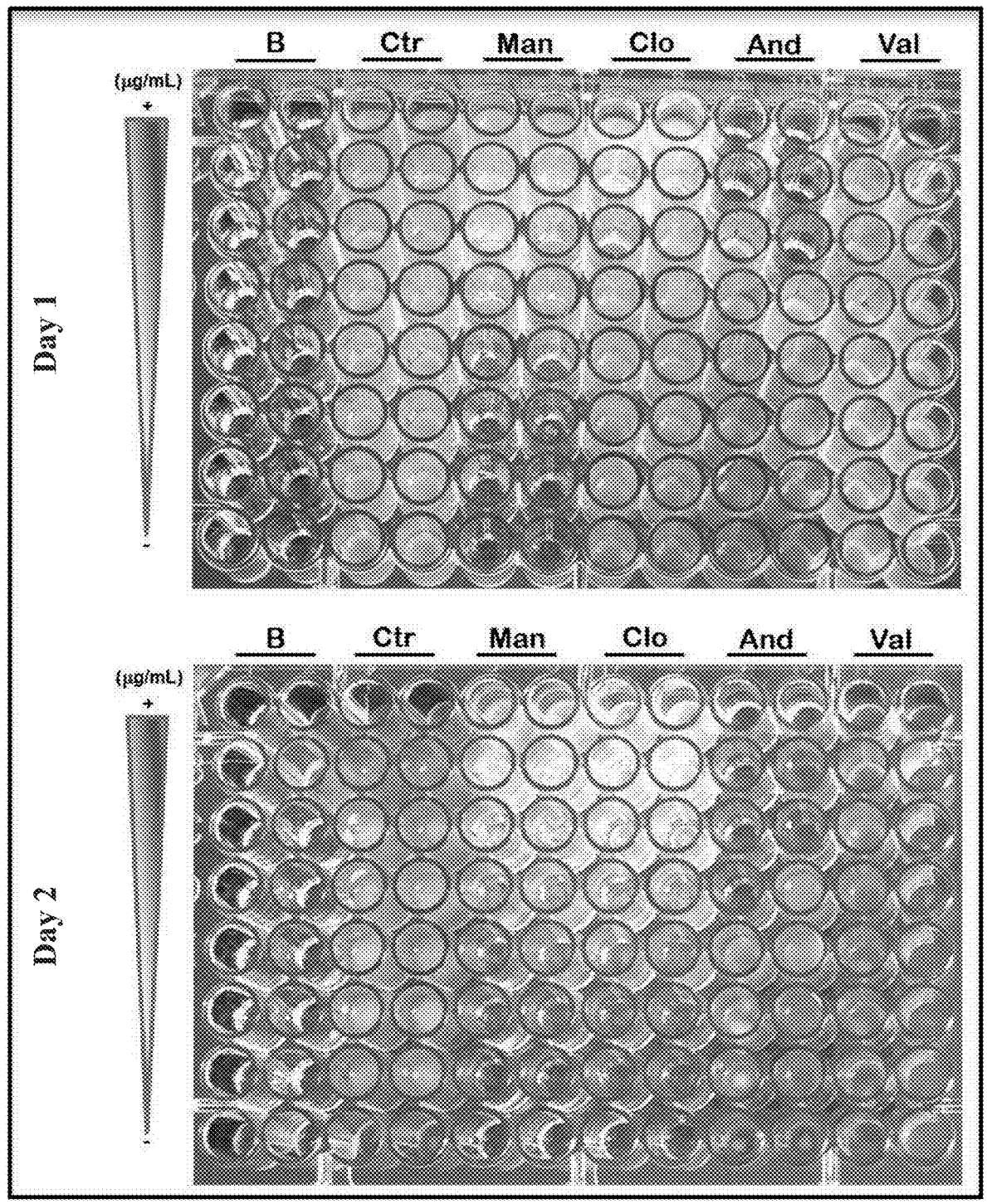

FIG. 5 shows plates resulted from the determination of the minimum inhibitory concentration (MIC) of Andranone against *Fusarium oxysporum* on 2 different days. B: Negative Control (PDB: Potato dextrose broth); Ctr: Control (Fungus+PDB); Man: Fungus+Mancozeb+PDB; Clo: Fungus+Chlorothalonil+PDB; And: Fungus+Andranone+PDB; [Man]=15.62-2000 mg/mL), [Clo]=15.62-2000 mg/mL), [And]=31.25-4000 mg/mL and [Val]=11.71 to 1500 mg/mL.

Figure 6:
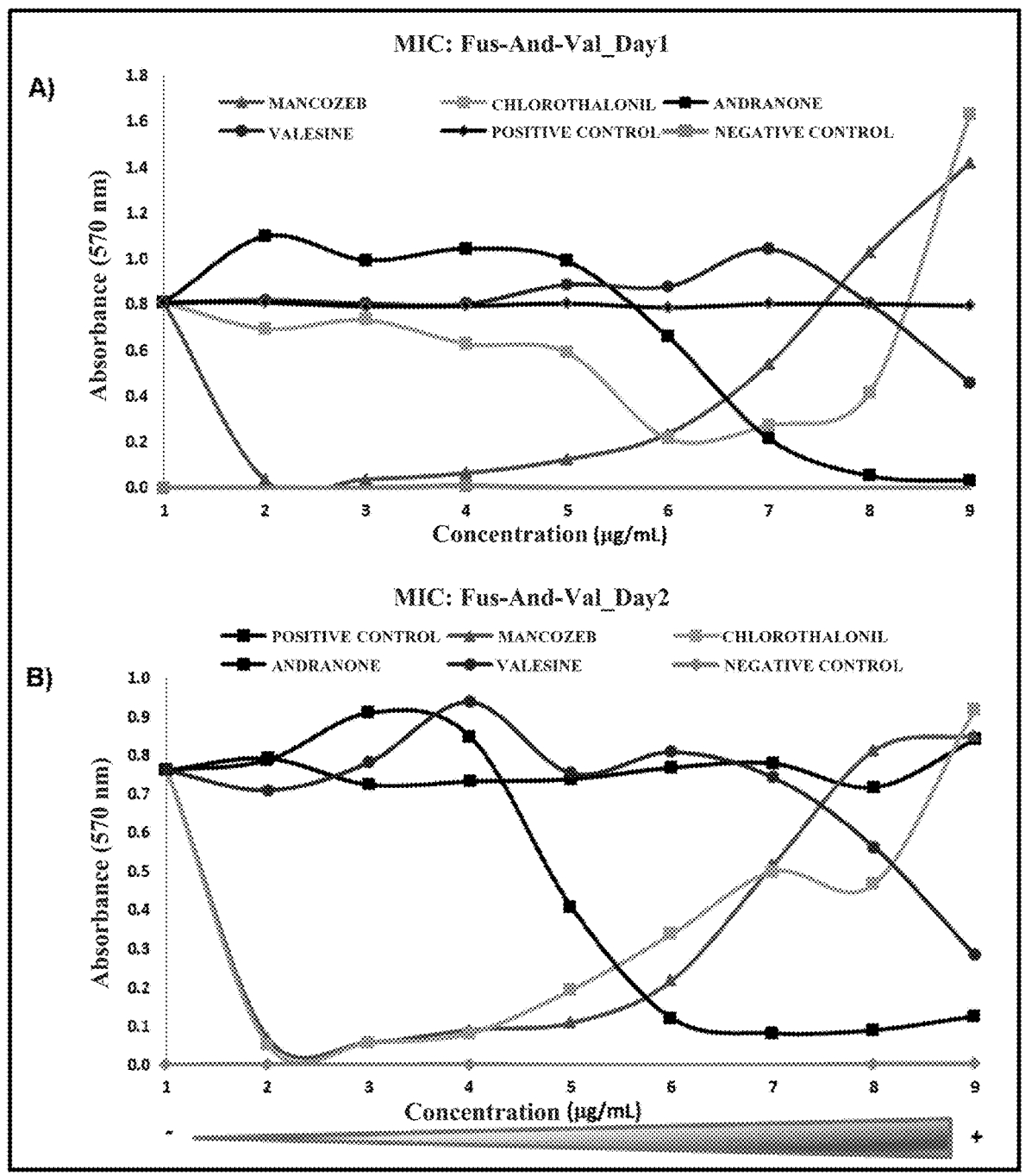

FIG. 6 illustrates the graphs showing the correlation between absorbance and Andranone concentration. A) Day 1, B) Day 2. C1 to C9: Concentration from the lowest to the highest, where C1=0 mg/mL. Mancozeb and Chlorothalonil=0-2000 mg/mL, Andranone=0-4000 mg/mL to 1500 mg/mL.

Figure 7:
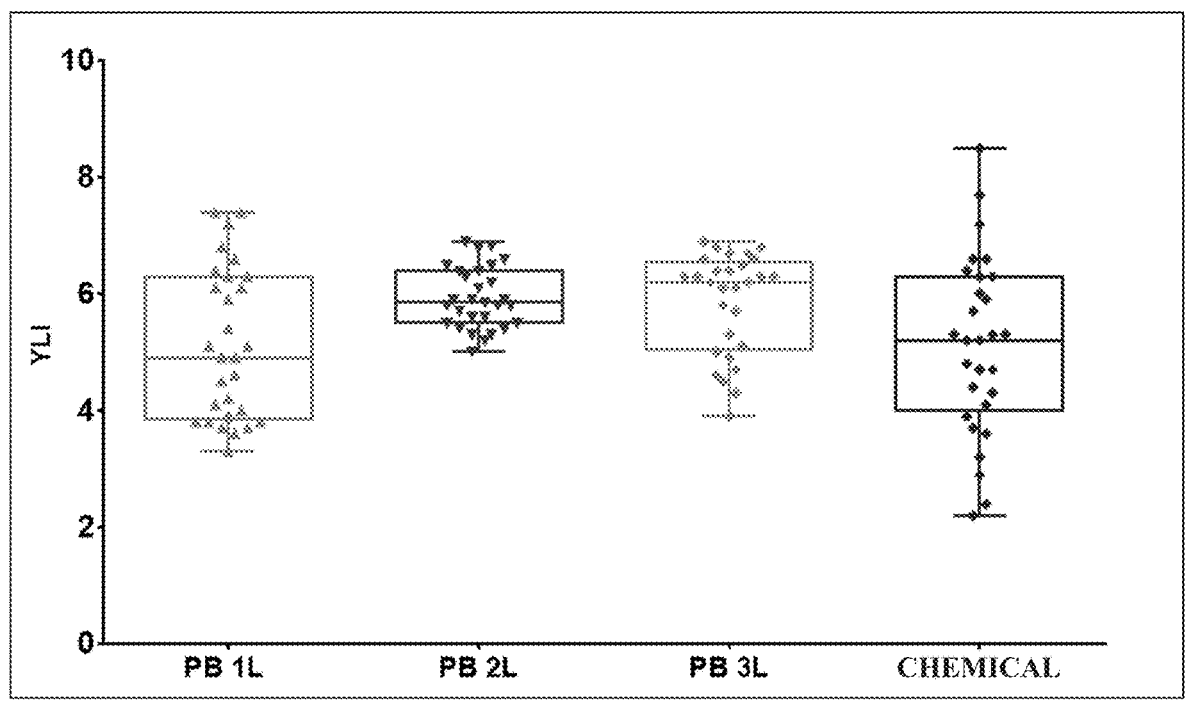

FIG. 7 shows a graph that shows the total response of the application of different treatments on the incidence of black Sigatoka (*Mycosphaerella fijiensis*) in banana (Musa sp) cultivation (N=10).

DETAILED DESCRIPTION OF THE INVENTION

The present invention provides an indole alkaloid of formula I

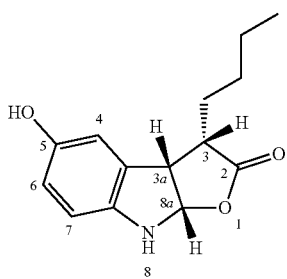

The indole alkaloid of formula I of the present invention, hereinafter names Andranone, is systematically named as ((3S,3aR,8aS)-3-butyl-5-hydroxy-3,3a,8a-trimethyl-3,3a,8,8a-tetrahydro-2H-furo[2,3-b]indol-2-one).

Andranone has the following physical, physicochemical, spectroscopic, and spectrometric properties:

Andranone (I). Yellow amorphous solid from MeOH; $R_f$ 0.56 ($CH_2Cl_2$:MeOH, 9.7:0.3);

$[\alpha]_D^{25}$: +122.3° (c 0.1, $CH_3OH$);

UV ($CH_3OH$)$\lambda_{max}$: 408 (4.47), 384 (4.14) y 363 (4.31) nm;

RMN-$^1$H (500 MHz, $CDCl_3$-d): δ 8.65 (s, 1H), 6.91 (dd, J=2.2, 0.7 Hz, 1H), 6.85 (d, J=8.3 Hz, 1H), 6.65 (dd, J=8.2, 2.2 Hz, 1H), 6.03 (dd, J=4.6, 2.6 Hz, 1H), 5.62 (d, J=4.6 Hz, 1H), 3.78-3.73 (m, 1H), 3.11 (dt, J=7.1, 6.1 Hz, 1H), 1.86 (dtd, J=13.4, 9.2, 6.0 Hz, 1H), 1.60 (dtd, J=13.4, 9.1, 6.0 Hz, 1H), 1.44-1.19 (m, 4H), 0.90 (t, J=7.0 Hz, 3H).

RMN-$^{13}$C (125 MHz, $CDCl_3$-d): δ 178.81, 154.53, 139.21, 129.25, 114.50, 112.39, 111.68, 91.04, 48.36, 47.08, 29.63, 28.72, 22.80, 13.78.

The indole alkaloid of formula I or Andranone, has a marked fungicidal effect against most phytopathogenic fungi that conventionally infest crops of commercial interest, and particularly has a strong inhibitory activity on the growth and development of phytopathogenic fungi such as *Fusarium* spp, *Rhizoctonia* spp, *Moniliophtora* spp, *Alternaria* spp, *Colletotrichum lindemunthianum*, *Colletotrichum glosporoides*, *Biopolaris* spp, *Verticillium* spp, and *Mycosphaerella fijiensis*.

Andranone is a stable molecule, so it can be used in the preparation of fungicidal compositions, preferably liquid, that are useful in ascomycete fungi control that affects economically important crops, such as banana (Musa×paradisiaca). Unlike other conventional fungicidal compounds, Andranone has an action mechanism that causes membrane disruption of fungi exposed to sustained concentrations of Andranone. Andranone irreversibly binds to the sterols present in the cytoplasmic membrane, inducing cell lysis of the fungus. Therefore, by not interfering with the enzymes that control metabolic pathways as commercial fungicides such as Chlorothalonil and Mancozeb do, Andranone toxicity is minimal for free-living organisms, so formulations derived from this Active principle can be used more safely than other available products. Therefore, Andranone can be used in both conventional and organic agriculture. Likewise, due to its action mechanism, the rate of resistance generated by Andranone is low, since its activity is derived from physical effects and not altering any biochemical process of the fungus, as occurs with Chlorothalonil and Mancozeb. Therefore, Andranone turns out to be a more effective option as a control agent for phytopathogenic fungi in crops.

The compound of general formula I is obtained in the first instance through a biotechnological process, from a liquid medium with a bacterial strain of *Bacillus tequilensis*, called (BT01).

BT01 is characterized by presenting a genomic sequence of the 16S Ribosomal subunit as shown below (SEQ ID NO: 1):

```
TGCAGTCGAGCGGACAGATGGGAGCTTGCTCCCTGATGTTAGCGGCGGA
CGGGTGAGTAACACGTGGGTAACCTGCCTGTAAGACTGGGATAACTCCG
GGAAACCGGGGCTAATACCGGATGGTTGTTTGAACCGCATGGTTCAAAC
ATAAAAGGTGGCTTCGGCTACCACTTACAGATGGACCCGCGGCGCATTA
GCTAGTTGGTGAGGTAACGGCTCACCAAGGCAACGATGCGTAGCCGACC
TGAGAGGGTGATCGGCCACACTGGGACTGAGACACGGCCCAGACTCCTA
CGGGAGGCAGCAGTAGGGAATCTTCCGCAATGGACGAAAGTCTGACGGA
GCAACGCCGCGTGAGTGATGAAGGTTTTCGGATCGTAAAGCTCTGTTGT
TAGGGAAGAACAAGTACCGTTCGAATAGGGCGGTACCTTGACGGTACCT
AACCAGAAAGCCACGGCTAACTACGTGCCAGCAGCCGCGGTAATACGTA
GGTGGCAAGCGTTGTCCGGAATTATTGGGCGTAAAGGGCTCGCAGGCGG
TTTCTTAAGTCTGATGTGAAAGCCCCCGGCTCAACCGGGGAGGGTCATT
GGAAACTGGGGAACTTGAGTGCAGAAGAGGAGAGTGGAATTCCACGTGT
AGCGGTGAAATGCGTAGAGATGTGGAGGAACACCAGTGGCGAAGGCGAC
TCTCTGGTCTGTAACTGACGCTGAAGAGCGAAAGCGTGGGGAGCGAACA
GGATTAGATACCCTGGTAGTCCACGCCGTAAACGATGAGTGCTAAGTGT
TAGGGGGTTTCCGCCCCTTAGTGCTGCAGCTAACGCATTAAGCACTCCG
CCTGGGGAGTACGGTCGCAAGACTGAAACTCAAAGGAATTGACGGGGGC
CCGCACAAGCGGTGGAGCATGTGGTTTAATTCGAAGCAACGCGAAGAAC
CTTACCAGGTCTTGACATCCTCTGACAATCCTAGAGATAGGACGTCCCC
TTCGGGGCAGAGTGACAGGTGGTGCATGGTTGTCGTCAGCTCGTGTCG
TGAGATGTTGGGTTAAGTCCCGCAACGAGCGCAACCCTTGATCTTAGTT
GCCAGCATTCAGTTGGGCACTCTAAGGTGACTGCCGGTGACAAACCGGA
GGAAGGTGGGGATGACGTCAAATCATCATGCCCCTTATGACCTGGGCTA
CACACGTGCTACAATGGACAGAACAAAGGGCAGCGAAACCGCGAGGTTA
AGCCAATCCCACAAATCTGTTCTCAGTTCGGATCGCAGTCTGCAACTCG
ACTGCGTGAAGCTGGAATCGCTAGTAATCGCGGATCAGCATGCCGCGGT
GAATACGTTCCCGGGCCTTGTACACACCGCCCGTCACACCACGAGAGTT
TGTAACACCCGAAGTCGGTGAGGTAACCTTTAGGAGCCAGCCGCCGAAG
G
```

BT01 can convert the amino acid tryptophan to indole propionic acid by deamination; and its subsequent cyclization and alkylation produces the indole alkaloid Andranone, processes that are by no means naturally present in other species and/or subspecies *Bacillus* tequilensis. In addition, to achieve the production of Andranona, BT01 is subjected to a biotechnological process that includes the steps:

a) Store purified cells of the BT01 strain by cryopreservation, in vials with glycerin at a temperature between −70° C. and −90° C.;

b) transferring a vial of cryopreserved BT01 strain to a laminar flow hood, without allowing the vial temperature to rise above −70° C. to −90° C. to keep 100% of the cells intact, and, scrape the surface of its contents with a sterile loop;

c) seed the scraping from step b) by streaking in Petri dishes with solid LB medium;

d) cultivate the Petri dishes with the BT01 strain planted, at a temperature between 20° C. and 30° C. for a time of between 20 and 36 hours, until the growth of the BT01 strain is observed.

e) take a biomass sample of the BT01 cells from the Petri dishes with a bacteriological loop and seed it in a liquid medium previously prepared with 0.3-0.7 g of dibasic potassium phosphate, 0.8-2.3 g of monobasic potassium phosphate, 0.1-0.3 g of magnesium sulfate, 19.8-25.4 g of potassium nitrate, 3-7 g of glucose, 8-11.2 g of sodium chloride, 7-10 g of nutrient broth and q.s 1000 mL of purified water and sterilized for 15 minutes at a pressure of 703.07 Kg/m² (lb/in²);

f) manually shake the culture medium obtained from step e) and cultivate the BT01 cells for between 5 and 8 days;

g) subjecting the culture medium obtained from step f) to a first liquid-liquid extraction with hexane three times, drying in Na₂SO₄ and concentrating on a rotary evaporator, recovering the organic phase, and subjecting it to a second extraction with chloroform three times, followed by drying in Na₂SO₄ and its subsequent concentration in a rotary evaporator, to thus obtain an organic residue;

h) absorb the organic residue on silica gel and place it on a column packed with silica gel (280 g, 8×55 cm), eluting with 100% CHCl₃, followed by 2% MeOH/CHCl₃ to obtain a complex mixture and;

i) separate the complex mixture by column chromatography (CC) using silica gel (300-400), eluting with a gradient of CHCl₃-MeOH (MeOH/CHCl₃ from 0% to 5%), until obtaining a cream-colored solid, which is the compound of formula I called Andranone.

Likewise, the present invention provides a method for obtaining the compound of formula I of the present invention, by means of a chemical synthesis that comprises the following steps:

a) Dissolve 1 mmol of 2-(5-hydroxy-1H-indol-3-yl)-acetic acid of formula (1), in 10 mL of dimethylformamide (DMF), having said 2-(5-hydroxy-1H-indol-3-yl)acetic acid the general formula (1):

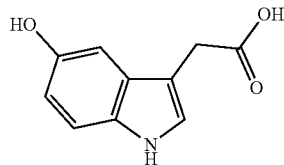

whose unequivocal characterization was established based on its spectroscopic properties, which are shown below:

RMN-¹H (500 MHz, CDCl₃-d): δ 9.55 (d, J=7.0 Hz, 1H), 8.43 (s, 1H), 7.25 (d, J=7.8 Hz, 1H), 7.17 (d, J=7.0 Hz, 1H), 7.10 (d, J=2.1 Hz, 1H), 6.80 (dd, J=7.7, 2.2 Hz, 1H), 3.64 (s, 2H).

RMN-¹³C (125 MHz, CDCl₃-d): δ 173.88, 150.00, 131.04, 128.82, 123.99, 114.02, 112.32, 110.42, 105.38, 32.25;

b) add to 1.5 mmol of molecular bromine, the solution from step a), in the presence of 15 mmol of potassium hydroxide at a temperature between 20° C. and 45° C., keeping the resulting solution under constant stirring for a time of 45-75 minutes, to obtain the compound 3a-bromo-5-hydroxy-3,3a,8,8a-tetrahydro-2H-furo[2,3-b]indol-2-one (2), as shown in the following reaction:

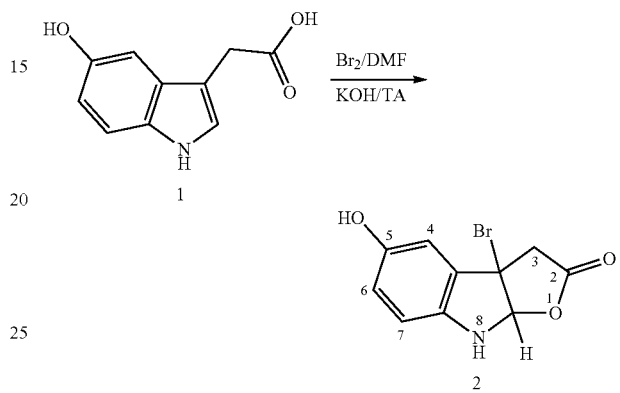

c) purifying compound (2) obtained by column chromatography, using mixtures of increasing polarity of hexane/ethyl acetate and silica gel (300-400 mesh) as support. The authenticity of Intermediate 2 was established based on the results of the spectroscopic analysis, which are shown below:

RMN-¹H (500 MHz, CDCl₃-d): δ 7.62 (s, 2H), 7.54 (d, J=3.7 Hz, 2H), 6.98 (d, J=2.2 Hz, 2H), 6.81 (d, J=8.0 Hz, 2H), 6.67 (dd, J=8.1, 2.2 Hz, 2H), 6.43 (d, J=3.7 Hz, 2H), 3.71 (s, 1H), 3.67 (s, 1H), 3.45 (s, 1H), 3.41 (s, 1H).

RMN-¹³C (125 MHz, CDCl₃-d): δ 212.31, 149.31, 141.78, 133.86, 115.39, 113.56, 112.91, 68.11, 64.29, 51.49, 48.28;

d) add 0.2 mmol of azobisisobutyronitrile (AIBN) and 5 mmol of tributyltin hydride, to 1 mmol of compound (2), previously dissolved in 10 mL of toluene, heating the mixture at reflux for 50-130 minutes to obtain compound 5-hydroxy-3,3,8,8-tetrahydro-2H-furo[2,3-b]indol-2-one (3) as shown in the following reaction:

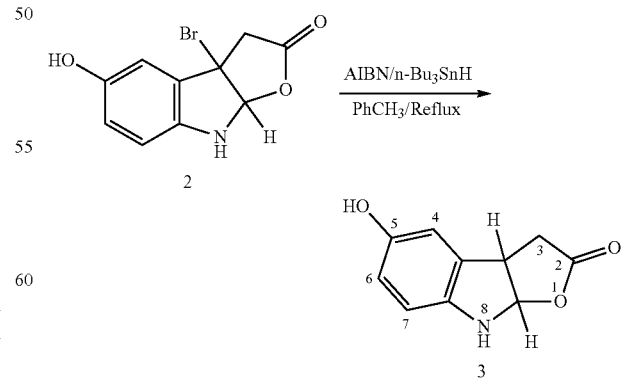

e) purifying compound (3) obtained by column chromatography using mixtures of increasing polarity of hexane/ethyl acetate and silica gel (300-400 mesh) as support. The authenticity of compound (3) was established based on the results of the spectroscopic analysis, which are shown below:

RMN-$^1$H (500 MHz, CDCl$_3$-d): δ 8.63 (s, 1H), 6.94-6.90 (m, 1H), 6.69 (d, J=8.3 Hz, 1H), 6.64 (dd, J=8.3, 2.1 Hz, 1H), 6.24 (t, J=4.1 Hz, 1H), 6.03 (d, J=4.2 Hz, 1H), 3.82-3.76 (m, 1H), 3.01 (dd, J=16.9, 5.1 Hz, 1H), 2.75 (dd, J=16.9, 4.9 Hz, 1H).

RMN-$^{13}$C (125 MHz, CDCl$_3$-d): δ 176.39, 154.50, 138.08, 129.75, 114.50, 112.50, 110.78, 90.59, 43.72, 35.80;

f) add dropwise to a suspension of 1.2 mmol of NaH in 5 mL of dry DMF and under a nitrogen atmosphere, 2 mmol of compound (3) dissolved in a minimum amount of dry DMF, with an addition funnel, stirring the reaction mixture for 15-35 min, to then add 1.20 mmol of n-butyl iodide, allowing the reaction mixture to reach room temperature to keep it that way for 6-10 hours, after which 30 mL of Acetic acid (AcOH) 0.05 M is added and extracted with methylene chloride, as shown in the following reaction:

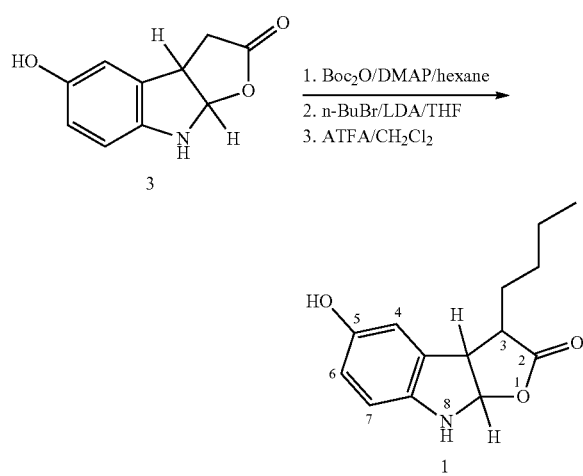

g) washing the organic phases obtained with a saturated solution of NaHCO$_3$ and subsequently with brine, and;

h) drying the washed organic phases of step g) with anhydrous Na$_2$SO$_4$ and purifying by column chromatography using mixtures of increasing polarity of hexane/ethyl acetate and silica gel (300-400 mesh) as support, thus obtaining the compound (I) which corresponds to the Andranone compound of formula I of the present invention.

The chemical synthesis described above allows obtaining the compound of formula I of the present invention with a yield of 28% as an isomeric mixture.

Andranone can be used in the manufacture of fungicidal compositions useful in the control of infestations of phytopathogenic fungi in crops of economic importance.

Preferably, Andranone is formulated in micro or nano-emulsified compositions, preferably containing liposomes of phosphatidylcholine. In one of the preferred embodiments of the present invention, the composition is a microencapsulated composition that is obtained from 30 g of a 7:3 mixture of a neutral surfactant such as an ethoxylated alcohol and phosphatidylcholine. The mixture (7:3) is stirred at constant speed at a temperature of between 70 and 90° C. for a time of 1 h and is allowed to stand until it reaches room temperature. Once room temperature is reached, 5 g of the compound of formula I of the present invention is added to the mixture and it is placed in an automatic mixer at 1000 rpm for 15 minutes to form liposomes, to which water is added as a vehicle to form a micro or nano emulsion, at the rate of 20 mL/min, until completing 1 liter.

The composition obtained by the process described above can be applied by foliar spraying on crops infested by phytopathogenic fungi, diluted in a proportion between 0.5% and 1% of the composition in water. When used in this way, the composition makes it possible to control and eradicate phytopathogenic fungi from crops without causing alterations in free-living organisms and without presenting toxic effects on workers who are in contact with crops or on personnel in charge of the application of the composition of the present invention.

To demonstrate the implementation of the present invention, the synthesis of the compound was carried out both by the biotechnological route and by the synthetic route.

Example 1. Biotechnological Process to Obtain Andranone

To carry out the process of the present invention, several different strains of *Bacillus* tequilensis were used and with the exception of the BT01 strain, none had the ability to produce Andranone. For purposes of exemplifying the production of the compound of formula I, two different strains of *Bacillus* tequilensis were used in the biotechnological process of the present invention. The strains used were the BT01 strain, whose genomic sequence of the 16S Ribosomal subunit was previously described, and the *Bacillus tequilensis* GYLH001 strain, which has the following genomic sequence of the 16S Ribosomal subunit (SEQ ID NO: 2):

CAGAGTTTGATCCTGGCTCAGGACGAACGCTGGCGGCGTGCCTAATACA

TGCAAGTCGAGCGGACAGATGGGAGCTTGCTCCCTGATGTTAGCGGCGG

ACGGGTGAGTAACACGTGGGTAACCTGCCTGTAAGACTGGGATAACTCC

GGGAAACCGGGGCTAATACCGGATGGTTGTTTGAACCGCATGGTTCAAA

CATAAAAGGTGGCTTCGGCTACCACTTACAGATGGACCCGCGGCGCATT

AGCTAGTTGGTGAGGTAACGGCTCACCAAGGCAACGATGCGTAGCCGAC

CTGAGAGGGTGATCGGCCACACTGGGACTGAGACACGGCCCAGACTCAC

GGGAGGCAGCAGTAGGGAATCTTCCGCAATGGACGAAAGTCTGACGGAG

CAACGCCGCGTGAGTGATGAAGGTTTTCGGATCGTAAAGCTCTGTTGTT

AGGGAAGAACAAGTACCGTTCGAATAGGGCGGTACCTTGACGGTACCTA

ACCAGAAAGCCACGGCTAACTACGTGCCAGCAGCCGCGGTAATACGTAG

GTGTGGCAAGCGTTGTCCGGAATTATTGGGCGTAAAGGGCTCGCAGGCG

TTCTTAAGTCTGATGTGAAAGCCCCCGGCTCAACCGGGGAGGGTCATTG

GAAACTGGGGAACTTGAGTGCAGAAGAGGAGAGTGGAATTCCACGTGTA

GCGGTGAAATGCGTAGAGATGTGGAGGAACACCAGTGGCGAAGGCGACT

CTCTGGTCTGTAACTGACGCTGAGGAGCGAAAGCGTGGGGAGCGAACAG

GATTAGATACCCTGGTAGTCCACGCCGTAAACGATGAGTGCTAAGTGTT

AGGGGGTTTCCGCCCCTTAGTGCTGCAGCTAACGCATTAAGCACTCCGC

CTGGGGAGTACGGTCGCAAGACTGAAACTCAAAGGAATTGACGGGGCC

-continued

CGCACAAGCGGTGGAGCATGTGGTTTAATTCGAAGCAACGCGAAGAACC

TTACCAGGTCTTGACATCCTCTGACAATCCTAGAGATAGGACGTCCCCT

TCGGGGCAGAGTGACAGGTGGTGCATGGTTGTCGTCAGCTCGTGTCGT

GAGATGTTGGGTTAAGTCCCGCAACGAGCGCAACCCTTGATCTTAGTTG

CCAGCATTCAGTTGGGCACTCTAAGGTGACTGCCGGTGACAAACCGGAG

GAAGGTGGGGATGACGTCAAATCATCATGCCCCTTATGACCTGGGCTAC

ACACGTGCTACAATGGACAGAACAAAGGGCAGCGAAACCGCGAGGTTAA

GAGCCAATCCCACAAATCTGTTCTCAGTTCGGATCGCAGTCTGCAACTC

CTGCGTGAAGCTGGAATCGCTAGTAATCGCGGATCAGCATGCCGCGGTG

AATACGTTCCCGGGCCTTGTACACACCGCCCGTCACACCACGAGAGTTT

GTAACACCCGAAGTCGGTGAGGTAACCTTTTAGGAGCCAGCCGCCGAAG

GTGGGACAGATGATTGGGGTGAAGTCGTAACAAGGTAGCCGTATCGGAA

GGTGCGGCTGGATCACCTCCT

To carry out the Andranona production tests, an adequate quantity of the BT01 and GYLH001 strains was stored separately in cryopreservation at temperatures between −70° C. and −90° C. in glycerin. Subsequently, one vial of each of the strains was transferred to a laminar flow hood in dry ice to prevent the cells from thawing and thus maintain 100% of the bacterial cells intact. Then, with the help of sterile loops, the surface of the samples was scraped and with the loops each of the strains was seeded separately in 2 Petri dishes with LB medium, streaking the bacteria in 4 fields of the dish. Finally, they were incubated at temperatures between 25° C. and 30° C. until a notable growth was observed.

Subsequently, a culture medium consisting of 0.3-0.7 g of dibasic potassium phosphate, 0.8-2.3 g of monobasic potassium phosphate, 0.1-0.3 g of magnesium sulfate, 19.8-25.4 g of potassium nitrate, 3-7 g of glucose, 8-11.2 g of sodium chloride, 7-10 g of nutrient broth and, q.s 1000 mL of purified water and sterilized for 15 minutes at a pressure of 703.07 Kg/m$^2$ (1 lb/in$^2$). Subsequently, using bacteriological loops, a biomass sample of each strain was taken separately from the Petri dishes and inoculated into flasks containing the liquid medium, shaking manually and placed in incubation for 6 days.

The culture medium of each of the flasks was subjected to liquid-liquid extraction to obtain an organic extract, which was analyzed by TLC and revealed with a vanillin solution. For this, the culture medium of each flask was first subjected to extraction with hexane three times, drying in Na$_2$SO$_4$ and concentration in a rotary evaporator. The aqueous phase obtained was subjected to a second extraction process with chloroform three times, followed by drying in Na$_2$SO$_4$ and subsequent concentration in rotary evaporation. 21 g of the organic residue from each flask were adsorbed separately on silica gel and placed on a column packed with silica gel (280 g, 8×55 cm), which was eluted with CHCl$_3$, followed by a gradient of CHCl$_3$-MeOH and finally with MeOH/CHCl$_3$ from 40% to 45%, to obtain 174 fractions of each extract of 200 mL each. According to TLC analysis, fractions showing similar components were combined and evaporated to dryness to provide 10 main fractions. Of the fractions obtained, only one showed a complex mixture on TLC analysis, which was separated by column chromatography (CC) using silica gel (300-400) and eluting with a CHCl$_3$-MeOH gradient (MeOH/CHCl$_3$ from 0% to 5%), from which a cream-colored solid was obtained. The analysis of its physical, spectroscopic, and spectrometric properties made it possible to characterize a molecular structure whose base skeleton is the indole alkaloid of formula I of the present invention. From the foregoing, it follows that only the BT01 strain can be used in the biotechnological process for obtaining Andranone described in the present invention.

Example 2. Chemical Synthesis of Andranone

To obtain the compound of the present invention through the chemical synthesis process of the invention, 1.5 mmol of molecular bromine was added to 1 mmol of 2-(5-hydroxy-1H-indol-3-yl)-acetic acid of formula (1), dissolved in 10 mL of dimethylformamide (DMF), in the presence of 15 mmol of potassium hydroxide at temperatures between 20° C. and 45° C. The resulting solution was kept under constant stirring for 45-75 minutes and was purified by column chromatography, using mixtures of increasing polarity of hexane/ethyl acetate and silica gel (300-400 mesh) as support. The purified compound was subjected to nuclear magnetic resonance analysis, obtaining the following resonance spectra:

RMN-$^1$H (500 MHz, CDCl$_3$-d): δ 7.62 (s, 2H), 7.54 (d, J=3.7 Hz, 2H), 6.98 (d, J=2.2 Hz, 2H), 6.81 (d, J=8.0 Hz, 2H), 6.67 (dd, J=8.1, 2.2 Hz, 2H), 6.43 (d, J=3.7 Hz, 2H), 3.71 (s, 1H), 3.67 (s, 1H), 3.45 (s, 1H), 3.41 (s, 1H)

RMN-$^{13}$C (125 MHz, CDCl$_3$-d): δ 212.31, 149.31, 141.78, 133.86, 115.39, 113.56, 112.91, 68.11, 64.29, 51.49, 48.28

Both resonance spectra reveal that the obtained compound is unequivocally the compound (2).

Subsequently, 0.2 mmol of azobisisobutyronitrile (AIBN) and 5 mmol of tributyltin hydride were added to 1 mmol of the obtained compound (2), previously dissolved in 10 mL of toluene, the mixture was heated under reflux for 50-130 minutes hours and, purified by column chromatography using mixtures of increasing polarity of hexane/ethyl acetate and silica gel (300-400 mesh) as support. The purified compound was subjected to nuclear magnetic resonance analysis, obtaining the following spectra:

RMN-$^1$H (500 MHz, CDCl$_3$-d): δ 8.63 (s, 1H), 6.94-6.90 (m, 1H), 6.69 (d, J=8.3 Hz, 1H), 6.64 (dd, J=8.3, 2.1 Hz, 1H), 6.24 (t, J=4.1 Hz, 1H), 6.03 (d, J=4.2 Hz, 1H), 3.82-3.76 (m, 1H), 3.01 (dd, J=16.9, 5.1 Hz, 1H), 2.75 (dd, J=16.9, 4.9 Hz, 1H)

RMN-$^{13}$C (125 MHz, CDCl$_3$-d): δ 176.39, 154.50, 138.08, 129.75, 114.50, 112.50, 110.78, 90.59, 43.72, 35.80

Both resonance spectra unequivocally corroborate the obtaining of compound (3).

Finally, to a suspension of 1.2 mmol of NaH in 5 mL of dry DMF and under nitrogen atmosphere, 2 mmol of compound (3), dissolved in a minimum amount of dry DMF, were added dropwise with an addition funnel. The reaction mixture was stirred for 15-35 min. After the established time, 1.20 mmol of n-butyl iodide was added and the reaction mixture was allowed to reach room temperature and was kept that way for 6-10 hours. After tttt time, 30 mL of 0.05 M acetic acid (AcOH) were added and extracted with methylene chloride (CH$_2$Cl$_2$). The organic phases were combined and washed with a saturated NaHCO$_3$ solution with brine, drying the obtained product with Na$_2$SO$_4$ anhydrous. The dry product was purified by column chromatography using mixtures of increasing polarity of hexane/ethyl acetate and silica gel (300-400 mesh) as support. The obtained compound was subjected to nuclear magnetic resonance analysis, obtaining the following resonance values:

RMN-$^1$H (500 MHz, CDCl$_3$-d): δ 8.65 (s, 1H), 6.91 (dd, J=2.2, 0.7 Hz, 1H), 6.85 (d, J=8.3 Hz, 1H), 6.65 (dd, J=8.2, 2.2 Hz, 1H), 6.03 (dd, J=4.6, 2.6 Hz, 1H), 5.62 (d, J=4.6 Hz, 1H), 3.78-3.73 (m, 1H), 3.11 (dt, J=7.1, 6.1 Hz, 1H), 1.86 (dtd, J=13.4, 9.2, 6.0 Hz, 1H), 1.60 (dtd, J=13.4, 9.1, 6.0 Hz, 1H), 1.44-1.19 (m, 4H), 0.90 (t, J=7.0 Hz, 3H).

RMN-$^{13}$C (125 MHz, CDCl$_3$-d): δ 178.81, 154.53, 139.21, 129.25, 114.50, 112.39, 111.68, 91.04, 48.36, 47.08, 29.63, 28.72, 22.80, 13.78.

The resonance values corroborated the presence of the compound (3-butyl-5-hydroxy-3,3,8-trimethyl-3,3a,8,8a-tetrahydro-2H-furo[2,3-b]indole-2-one or Andranone as the only product of the reaction.

Example 3. Activity of Andranone

To demonstrate the fungicidal activity of Andranone, firstly, its bioactivity was weighed and the minimum inhibitory concentration (MIC) of Andranone on various phytopathogenic fungi was determined. First, its effect on the growth of samples of *Colletotrichum gloeosporioides* was assessed. The weighting of the activity was established in a spectrophotometric model through the reduction of Triphenyl Tetrazolium Chloride as a measure of bacterial metabolism (oxide reduction system). The *C. gloeosporioides* samples were incubated for 24 h at 37° C. in the presence of increasing amounts of Andranone and the control agents Chlorothalonil and Mancozeb. After the indicated time, the amount of formazan produced was assessed by colorimetry, which is indicative of the amount of viable fungal cells after the treatments.

FIG. 2 shows the plates of a biological replica on two different days on the growth of *Colletrotrichum gloeosporioides* in the presence of Andranone and controls (Mancozeb and Chlorothalonil) to determine the minimum inhibitory concentration (MIC) of said compounds. In general, it can be noted that some differences in the results were observed in the Andranone treatments, in addition, there was also a greater growth of the fungus on day 2.

As expected, in the positive control (Fungus in PDB) a notable growth of the fungus was observed on both days of analysis. In the case of treatment with Mancozeb, no growth of the fungus was observed in any of the concentrations evaluated in the range of 7.81 to 250 mg/mL. With the Chlorothalonil treatment, the fungus was not able to grow in any of the evaluated concentrations of this fungicide in the 2 days of analysis. Regarding the treatment in the presence of Andranone, there were differences between the 2 days of analysis since on day 1 the fungus did not grow at concentrations higher than 500 mg/mL, and on day 2 the fungus was not able to grow at concentrations higher than 937.5 mg/mL, there was no reproducibility between the days, but there was between the technical replicates of the 2 evaluated days.

FIG. 3 shows the correlation of absorbance with respect to different concentrations analyzed of different treatments carried out by analyst 1, where concentration 0 is equal to 0 mg/mL and 1 to 8 is from the lowest to highest concentration, respectively. It can be seen that the absorbance of the negative control was zero throughout the experiment, in the control the absorbance is constant in the 2 days of analysis (black line). In the Mancozeb treatment, in all the concentrations evaluated, the absorbance is lower compared to the absorbance of the control on both days of analysis.

Chlorothalonil presented a response similar to that of Mancozeb (lower absorbances than the control in the 8 concentrations), with the Mancozeb and Chlorothalonil treatments being the treatments with the lowest absorbances compared to the control. In the Andranone treatment, on day 1 the absorbances of concentrations 1 to 4 (62.5 to 250 mg/mL) are very similar to the control and from concentrations 5 to 8 the absorbance decreases, that is, the absorbance decreases as Andranone concentration increases, reaching zero at concentrations of 6, 7 and 8 corresponding to 500, 937.5 and 1000 mg/mL, respectively, which indicates that at higher concentrations of Andranone the growth of the fungus and/or metabolic activity of the fungus is nil. On day 2, the absorbances of concentrations 1 to 6 (62.5 to 500 mg/mL) are very similar to the control and from concentrations 7 and 8 the absorbance decreases to zero (937.5 and 1000 mg/mL, respectively) (FIG. 4 and Table 1).

TABLE 1

Minimum inhibitory concentration (MIC) of Andranone, in the presence of *Colletotrichum gloeosporioides*
Minimum inhibitory concentration (MIC)* (mg/mL) of various compounds in the presence of *C. gloeosporioides*

| Treatment | Average Analyst 1 | Average Analyst 2 | Average |
|---|---|---|---|
| Control | — | — | — |
| Mancozeb | 7.8 ± 0.0 | 15.6 ± 11.0 | 11.7 ± 5.5 |
| Chlorothalonil | 7.8 ± 0.0 | 23.4 ± 22.1 | 15.6 ± 11.0 |
| Andranone | 718.7 ± 309.3 | 828.1 ± 51.5 | 773.4 ± 77.3 |

*The MIC value corresponds to the average of 6 technical replicates of a biological replica carried out independently on 2 different days by 2 different analysts, with their respective standard deviation.
Nd: not determined.

FIG. 5 shows the plates of a biological replica on 2 different days carried out by the same analyst of the growth of *Fusarium oxysporum* in the presence of Andranone and controls (Mancozeb and Chlorothalonil) to determine the minimum inhibitory concentration (MIC) of said compounds. In general, it can be noted that some differences were observed in the results of day 1 and day 2, mainly in the Chlorothalonil and Andranone treatments, in addition, there was also a greater growth of the fungus on day 2.

In the positive control (Fungus in PDB) a notable growth of the fungus was observed on both days of analysis. In the case of treatment with Mancozeb, a slight growth of the fungus was observed, mainly at concentrations of 250 to 2000 mg/mL, although there was no change in the salt color due to its reduction by the fungus. With the Chlorothalonil treatment, differences were observed between the 2 days of analysis since on day 1 it was observed that the fungus was not able to grow in the highest concentrations of this fungicide, growing from 500 to 15.62 mg/mL presenting the salt color change due to its reduction. On the other hand, on day 2, a slight growth of the fungus was observed, mainly at concentrations of 125 to 2000 mg/mL, although there was no change in the salt color due to its reduction by the fungus.

Regarding the treatment in the presence of Andranona, on day 1 the fungus did not grow at the highest concentrations of 2000 and 4000 and on day 2 the fungus was not able to grow from the concentrations of 1000, 2000, and 4000 mg/mL.

FIG. 6 shows the correlation of absorbance with respect to the different concentrations analyzed for the different treatments, where concentration 1 is equal to 0 mg/mL. It was observed that the absorbance of the negative control was zero and in the positive control, the absorbance is constant in the 2 days of analysis (black line). In the Mancozeb treatment, the absorbance increases as the concentration of this compound increase on both days. Chlorothalonil presented a trend similar to that of Mancozeb, except that in this treatment variations were observed between day 1 and day 2.

In the treatment with Andranone, the absorbance decreases as the concentration of this compound increases, which indicates that at the highest concentrations of Andranone the growth of the fungus is almost null (at 4000, 2000, and 1000 mg/mL) and in the range from 250 to 31.25 mg/mL the absorbance is higher than that of the positive control.

Table 2 summarizes the results obtained to determine the MIC of Andranone, Mancozeb, and Chlorothalonil, which correspond to the average of a biological replica carried out independently on 2 different days.

TABLE 2

Minimum inhibitory concentration (MIC) for Andranone, on the development of *Fusarium oxysporum*
Minimum inhibitory concentration (MIC) (mg/mL) of various compounds in the presence of *Fusarium oxysporum*

| Treatment | MIC (mg/mL) | Inhibition Type | Absorbance (570 nm) |
|---|---|---|---|
| Control | — | — | 0.78 ± 0.02 |
| Mancozeb | Nd | — | — |
| Chlorothalonil | 1.00 | Moderate | 0.45 ± 0.04 |
| Andranone | 1.00 | Moderate | 0.15 ± 0.09 |

Said Table 2 includes a column that shows the inhibition type for each compound, in which the MIC is determined, and it is established that a strong inhibition is considered in the samples that present a MIC=0.5 mg/mL, a moderate inhibition occurs in compounds with a MIC between 0.6 to 1 mg/mL, and finally a weak inhibition is considered for compounds with a MIC greater than 1.6 mg/mL. Table 2 includes a column with the average of the absorbances of the 2 days of the control and the treatments. The absorbance of the treatments corresponds to the concentration at which the MIC was established for each compound.

On the other hand, Andranona field tests were carried out. To carry out these tests, a microencapsulated composition was prepared with the compound of formula I of the present invention. First, 30 g of a 7:3 mixture of an ethoxylated alcohol and phosphatidylcholine was prepared. The mixture (7:3) was stirred at a constant speed and at temperatures between 70° C. and 90° C. for 1 h. After that time, the mixture was left to stand until it reached room temperature. Once room temperature was reached, 5 g of the compound of formula I of the present invention was added to the mixture, and the mixture was placed in an automatic mixer at 1000 rpm for 15 minutes to form liposomes finally, water was added as a vehicle to form a micro emulsion, at a rate of 20 mL/min, until completing 1 liter.

The evaluation to weigh the fungicidal activity of the microemulsified composition of Andranone was carried out on the incidence and severity of the damage induced by *Mycosphaerella fijiensis* (*Sigatoka negra*) in banana crops (Musa sp). It should be noted that as a result of the pathogenic action of *Mycosphaerella fijiensis*, a series of symptoms appear on the leaves of the affected plants, ranging from dots and dashes to necrotic spots, passing through different stages. For the evaluation, a completely randomized block design was established with three replications in 1 ha of banana cultivation in Mazatlán, Chiapas, as described in Table 3.

TABLE 3

Distribution of treatments to be evaluated on the incidence of *Mycosphaerella fijiensis* in banana crops.

| Treatment | PRODUCT | DOSE (ppm) | APPLICATION PERIOD (DAYS) |
|---|---|---|---|
| A | Andranone micro- | 50 | 7 d |
| B | emulsified | 100 | 7 d |
| C | composition | 150 | 7 d |
| D | Chemical agent | 1 L | 7 d |

The test monitoring intervals were established every 4 and 5 days. The established measurement variables were the total leaves number per marked plant and the youngest leaf infected (YLI) was determined, quantifying it as the leaf that shows the development of the pathogen (Table 4). Likewise, the yield was determined as the weight of what was produced in each of the harvested stalks for each of the treatments. The evaluation began on Apr. 6, 2016 and ended on Jan. 30, 2017. The application surface was taken as that corresponding to 10 plants per treatment p, which were enclosed in colored tapes. The application volume was established at 200 L/ha equivalent to 29 L of water per treatment.

FIG. 7 and Table 4 show that in the application of the chemical treatment, a wide variability in the incidence (YLI) of the pathogen is observed, which demonstrates a lower disease control.

TABLE 4

Average incidence rate (YLI) of black sigatoka (*Mycosphaerella fijiensis*) in banana plants in the bioactivity validation of the composition of the present invention.

| | Andranone (50 ppm) | | | Andranone (100 ppm) | | | Andranone (150 ppm) | | | CHEMICAL PRODUCT | | |
|---|---|---|---|---|---|---|---|---|---|---|---|---|
| Day | X | ES | N | X | ES | N | X | ES | N | X | ES | N |
| 10 apr | 7.2 | 0.332 | 10 | 5.85 | 0.454 | 10 | 6.1 | 0.327 | 10 | 4.10 | 0.453 | 10 |
| 17 apr | 7.4 | 0.196 | 10 | 5.6 | 0.21 | 10 | 6.7 | 0.232 | 10 | 5.30 | 0.343 | 10 |
| 24 apr | 7.4 | 0.324 | 10 | 5.0 | 0.542 | 10 | 6.4 | 0.72 | 10 | 5.20 | 0.323 | 10 |
| 1 may | 6.8 | 0.267 | 10 | 5.3 | 0.471 | 10 | 6.1 | 0.333 | 10 | 4.70 | 0.995 | 10 |
| 8 may | 6.3 | 0.3 | 10 | 5.4 | 1.851 | 10 | 6.5 | 0.219 | 10 | 7.70 | 0.234 | 10 |
| 15 may | 6.4 | 0.284 | 10 | 5.9 | 1.62 | 10 | 6.7 | 1.38 | 10 | 8.50 | 0.88 | 10 |
| 5 jun | 6.1 | 0.312 | 10 | 6.1 | 1.703 | 10 | 5.1 | 0.597 | 10 | 5.70 | 0.765 | 10 |
| 12 jun | 5.9 | 0.496 | 10 | 5.3 | 0.277 | 10 | 6.3 | 0.629 | 10 | 4.70 | 0.335 | 10 |
| 19 jun | 5.1 | 0.526 | 10 | 5.7 | 0.423 | 10 | 6.4 | 0.127 | 10 | 4.30 | 0.559 | 10 |
| 26 jun | 4.9 | 0.674 | 10 | 5.4 | 0.618 | 10 | 5.7 | 0.578 | 10 | 4.40 | 0.371 | 10 |
| 23 jul | 4.0 | 0.285 | 10 | 5.5 | 0.408 | 10 | 5.3 | 0.796 | 10 | 7.20 | 0.141 | 10 |

TABLE 4-continued

Average incidence rate (YLI) of black sigatoka (*Mycosphaerella fijiensis*) in banana plants in the bioactivity validation of the composition of the present invention.

| Day | Andranone (50 ppm) | | | Andranone (100 ppm) | | | Andranone (150 ppm) | | | CHEMICAL PRODUCT | | |
|---|---|---|---|---|---|---|---|---|---|---|---|---|
| | X | ES | N | X | ES | N | X | ES | N | X | ES | N |
| 30 jul | 3.6 | 0.4 | 10 | 6.4 | 0.415 | 10 | 5.0 | 0.309 | 10 | 4.80 | 0.955 | 10 |
| 6 aug | 3.7 | 0.126 | 10 | 6.6 | 0.31 | 10 | 5.8 | 0.397 | 10 | 6.30 | 0.967 | 10 |
| 13 aug | 3.9 | 0.32 | 10 | 6.83 | 0.359 | 10 | 6.2 | 0.356 | 10 | 5.30 | 0.783 | 10 |
| 20 aug | 3.3 | 0.438 | 10 | 6.8 | 0.632 | 10 | 6.6 | 1.312 | 10 | 6.60 | 0.562 | 10 |
| 24 aug | 3.7 | 0.476 | 10 | 6.5 | 0.885 | 10 | 6.3 | 0.761 | 10 | 5.30 | 0.30 | 10 |
| 31 aug | 3.8 | 0.291 | 10 | 6.9 | 0.567 | 10 | 6.2 | 0.249 | 10 | 5.20 | 0.52 | 10 |
| 7 sep | 6.1 | 0.348 | 10 | 5.9 | 0.504 | 10 | 6.6 | 0.267 | 10 | 6.00 | 0.955 | 10 |
| 14 sep | 6.6 | 0.379 | 10 | 6.3 | 0.517 | 10 | 6.8 | 0.314 | 10 | 6.60 | 0.763 | 10 |
| 21 sep | 6.3 | 0.423 | 10 | 5.8 | 0.467 | 10 | 6.3 | 0.3 | 10 | 5.90 | 0.706 | 10 |
| 28 sep | 5.4 | 0.452 | 10 | 5.9 | 0.547 | 10 | 6.8 | 0.389 | 10 | 6.40 | 0.267 | 10 |
| 5 oct | 4.9 | 0.547 | 10 | 5.8 | 0.34 | 10 | 6.3 | 0.452 | 10 | 6.30 | 0.517 | 10 |
| 12 oct | 5.1 | 0.586 | 10 | 5.5 | 0.224 | 10 | 6.9 | 0.547 | 10 | 3.20 | 0.249 | 10 |
| 19 oct | 4.6 | 0.562 | 10 | 6.5 | 0.224 | 10 | 4.5 | 0.5 | 10 | 2.20 | 0.213 | 10 |
| 26 oct | 4.2 | 0.629 | 10 | 6.4 | 0.163 | 10 | 4.9 | 0.482 | 10 | 2.90 | 0.233 | 10 |
| 2 nov | 4.5 | 0.619 | 10 | 6.2 | 0.2 | 10 | 4.6 | 0.618 | 10 | 3.90 | 0.233 | 10 |
| 9 nov | 4.1 | 0.567 | 10 | 5.8 | 0.2 | 10 | 3.9 | 0.433 | 10 | 3.70 | 0.416 | 10 |
| 16 nov | 3.8 | 0.742 | 10 | 5.2 | 0.291 | 10 | 4.7 | 0.817 | 10 | 2.40 | 0.476 | 10 |
| 23 nov | 3.8 | 0.611 | 10 | 5.6 | 0.221 | 10 | 4.3 | 0.496 | 10 | 3.60 | 0.499 | 10 |

The applications of the composition of the present invention at different concentrations displayed the best control of the disease since, as can be seen in FIG. 7, there is less variability throughout the study period. Finally, Table 5 shows the production yields for each treatment, and as can be seen, the treatment with the composition of the present invention at a dose of 2 L was the best with respect to all the treatments.

TABLE 5

The total yield obtained during the evaluation of the composition of the present invention for the control of black Sigatoka in banana crops

| | Andranone | | | CHEMICAL PRODUCT |
|---|---|---|---|---|
| | 50 ppm | 100 ppm | 150 ppm | |
| Harvested bunches | 17 | 18 | 17 | 14 |
| Minimum weight (g) | 20094 | 20082 | 18728 | 16881 |
| Maximum weight (g) | 34732 | 38339 | 33953 | 34001 |
| Average per bunch (g) | 25604 | 27805 | 27292 | 25270 |
| Standard deviation (g) | 4077 | 5193 | 4626 | 4376 |
| C.V. | 15.92% | 18.68% | 16.95% | 17.32% |
| Total weight (g) | 435268 | 500489 | 463961 | 353779 |

Finally, tests were carried out to determine the toxicity of Andranone in mammals, fish, aquatic invertebrates and terrestrial invertebrates. The summary of the results is shown in Table 6.

TABLE 6

Andranone toxicity in free-living organisms

| Study | Result |
|---|---|
| Acute toxicity in terrestrial flora | >1000 mg/L after 21 days of exposure |
| Acute toxicity in terrestrial fauna Earthworm - *Eisenia foetida* | >100 mg/kg |

TABLE 6-continued

Andranone toxicity in free-living organisms

| Study | Result |
|---|---|
| Toxicity to a species of quail bird | >2000 mg/L after 14 days of administration |

TABLE 6-continued

Andranone toxicity in free-living organisms

| Study | Result |
|---|---|
| Effects on aquatic flora Cyanobacteria | >100 mg/L after 72 h of contact |
| Effects on aquatic fauna *Daphnia magna* | >100 mg/L |
| Acute median lethal concentration ($LC_{50}$) at 96 hours of exposure for a species of fish (Rainbow Trout) | >100 mg/L after 96 h of exposure. |
| Median lethal concentration ($LC_{50}$) in an aquatic plant species: Green algae (*Selenastrum capricornatum*) | >100 mg/L after 72 h of contact |

TABLE 6-continued

Andranone toxicity in free-living organisms

| Study | Result |
|---|---|
| Impact on populations of beneficial insects and pollinators (*Apis mellifera* bees) | >100 mg after 48 hours of application |

The results above shown demonstrate the null toxicity of Andranone on free-living organisms.

The present invention has been described according to a preferred embodiment; however, it will be apparent to a person skilled in the art that modifications may be made to the invention without departing from its spirit and scope.

The invention claimed is:

1. A compound of formula I:

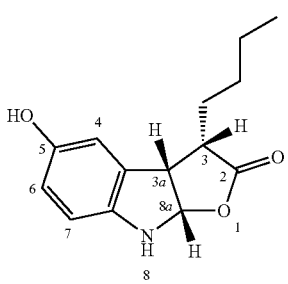

I which has a spectrum of RMN-$^1$H (500 MHz, CDCl$_3$-d): δ 8.65 (s, 1H), 6.91 (dd, J=2.2, 0.7 Hz, 1H), 6.85 (d, J=8.3 Hz, 1H), 6.65 (dd, J=8.2, 2.2 Hz, 1H), 6.03 (dd, J=4.6, 2.6 Hz, 1H), 5.62 (d, J=4.6 Hz, 1H), 3.78-3.73 (m, 1H), 3.11 (dt, J=7.1, 6.1 Hz, 1H), 1.86 (dtd, J=13.4, 9.2, 6.0 Hz, 1H), 1.60 (dtd, J=13.4, 9.1, 6.0 Hz, 1H), 1.44-1.19 (m, 4H), 0.90 (t, J=7.0 Hz, 3H) and a spectrum of RMN-$^{13}$C (125 MHz, CDCl$_3$-d): δ 178.81, 154.53, 139.21, 129.25, 114.50, 112.39, 111.68, 91.04, 4836, 47.08, 29.63, 28.72, 22.80, 13.78.

2. The compound according to claim 1, wherein the compound has a yellow amorphous solid from MeOH with an R$_f$ 0.56 in a mobile phase of CH$_2$Cl$_2$:MeOH, 9.7:0.3.

3. The compound according to claim 1, wherein the compound has a [α]$_D$$^{25}$: +122.3° (c 0.1, CH$_3$OH).

4. The compound according to claim 1, wherein the compound has a UV (CH$_3$OH)λ$_{max}$ spectrum of 408 (4.47), 384 (4.14) and 363 (4.31) nm.

5. The compound according to claim 1, wherein the compound has fungicidal activity.

6. The compound according to claim 1, wherein the compound is an indole alkaloid called Andranone.

7. The compound according to claim 5, wherein the fungicidal activity is effective for the control of *Fusarium* spp, *Rhizoctonia* spp, *Moniliophtora* spp, *Alternaria* spp,

*Colletotrichum lindemunthianum*, *Colletotrichum glosporoides*, *Biopolaris* spp, *Verticillium* spp, and *Mycosphaerella fijiensis*.

8. A method for chemical synthesis of the compound of claim 1, comprising the steps of:
  a) adding 1.5 mmol of molecular bromine to 1 mmol of 2-(5-hydroxy-1H-indol-3-yl)acetic acid, compound (1)

dissolved in 10 mL of dimethylformamide (DMF), in the presence of 15 mmol of potassium hydroxide at temperatures between 20° C. and 45° C., keeping the resulting solution under constant stirring for 45-75 min to obtain a compound (2);

b) purifying the obtained compound (2), by column chromatography using mixtures of increasing polarity of hexane/ethyl acetate and silica gel (300-400 mesh) as support;
  c) adding, to 1 mmol of compound (2) previously dissolved in 10 mL of toluene, 0.2 mmol of azobisisobutyronitrile (AIBN) and 5 mmol of tributyltin hydride, heating the mixture at reflux for 50-130 minutes to obtain a compound (3), d) purifying the obtained compound (3) by column chromatography using mixtures of increasing polarity of hexane/ethyl acetate and silica gel (300-400 mesh) as support;
  e) adding, dropwise with an addition funnel, 2 mmol of compound (3) dissolved in a minimum amount of dry DMF to a suspension of 1.2 mmol of NaH in 5 mL of dry DMF and under nitrogen atmosphere at 0° C., stirring for 15-35 min to obtain a mixture;
  f) adding 1.20 mmol of n-butyl iodide to the mixture of step e), allowing the mixture to reach room temperature and maintaining the mixture at room temperature for 6-10 hours;
  g) adding, to the room-temperature mixture from step f), 30 mL of 0.05 M acetic acid (AcOH) and extracting an organic phase with methylene chloride;
  h) washing the organic phase obtained in step g) with a saturated solution of $NaHCO_3$, followed by washing with brine to obtain a washed organic phase;
  i) drying the washed organic phase from step h) with anhydrous $Na_2SO_4$; and
  j) purifying the dry organic phase of step i) by column chromatography using mixtures of increasing polarity of hexane/ethyl acetate and silica gel (300-400 mesh) as support to obtain the compound of formula I.

9. A biotechnological process for obtaining the compound of claim 1, comprising the steps of:
  a) storing purified cells of BT01 strain by cryopreservation in vials with glycerin at temperatures between −70° C. and −90° C. to obtain cryopreserved BT01;
  b) transferring a vial of cryopreserved BT01 strain to a laminar flow hood, without allowing the temperature of the vial to rise above −70° C. to −90° C., to keep 100% of the cells intact, and scraping a surface of the vial of its contents with a sterile loop to obtain a vial scraping;
  c) seeding the vial scraping from step b) by streaking in Petri dishes with solid LB medium;
  d) cultivating the Petri dishes with a planted BT01 strain, at temperatures between 25° C. and 30° C. for a time between 20 and 36 hours, until growth of the BT01 strain is observed;
  e) taking a sample of biomass of the BT01 cells from the Petri dishes with a bacteriological loop and seeding the sample of biomass in a liquid medium previously prepared with 0.3-0.7 g of dibasic potassium phosphate, 0.8-2.3 g of monobasic potassium phosphate, 0.1-0.3 g of magnesium sulfate, 19.8-25.4 g of potassium nitrate, 3-7 g of glucose, 8-11.2 g of sodium chloride, 7-10 g of nutrient broth and q.s 1000 mL of purified water and sterilized for 15 minutes at a pressure of 703.07 $Kg/m^2$ ($lb/in^2$) to obtain a culture medium;
  f) manually shaking the culture medium obtained from step e) and cultivating the BT01 cells for 5-8 days;
  g) subjecting the culture medium obtained from step f) to a first extraction with hexane three times, drying in $Na_2SO_4$, and concentrating on a rotary evaporator, recovering the aqueous phase and subjecting the aqueous phase to a second extraction with chloroform three times, followed by drying in $Na_2SO_4$, and concentrating the aqueous phase in a rotary evaporator, to thus obtain an organic residue;
  h) absorbing the organic residue on silica gel and placing the organic residue on a column packed with silica gel (280 g, 8×55 cm), eluting with 100% $CHCl_3$, followed by 2% $MeOH/CHCl_3$ to obtain a complex mixture; and
  i) separating the complex mixture by column chromatography (CCr) using silica gel (300-400), eluting with a gradient of $CHCl_3$-MeOH ($MeOH/CHCl_3$ from 0% to 5%), until obtaining a cream-colored solid, which is the compound of formula I.

10. The biotechnological process of claim 9, characterized in that the BT01 strain has a genomic sequence of the 16s subunit having the sequence of SEQ ID NO: 1.

11. A fungicidal composition for the control and eradication of phytopathogenic fungi in crops, comprising between 0.1 and 0.5 g/L of the compound of claim 1 micro or nano encapsulated in phosphatidylcholine liposomes.

12. The composition according claim 11, wherein the composition is a micro or nano emulsion.

13. The composition according to claim 11, wherein the composition is adapted to be used at a rate of between 0.5 and 1.0 L per hectare of cultivation.

14. The composition according to claim 11, wherein the phytopathogenic fungi are selected from *Fusarium* spp, *Rhizoctonia* spp, *Moniliophtora* spp, *Alternaria* spp, *Colletotrichum lindemunthianum*, *Colletotrichum glosporoides*, *Biopolaris* spp, *Verticillium* spp, and *Mycosphaerella fijiensis*.

15. A method of using the compound of claim 1 as a fungicide, comprising applying the compound to a fungus.

16. The method according to claim 15, wherein the compound disrupts the cytoplasmic membrane of phytopathogenic fungi.

17. The method according to claim 15, wherein the compound is included in a fungicidal composition.

18. The method according to claim 17, wherein the fungicidal composition is a micro or nano-emulsified composition.

19. The method according to claim 15, wherein the compound is effective in the control of *Fusarium* spp, *Rhizoctonia* spp, *Moniliophtora* spp, *Alternaria* spp, *Colletotrichum lindemunthianum*, *Colletotrichum glosporoides*, *Biopolaris* spp, *Verticillium* spp, and *Mycosphaerella fijiensis*.

* * * * *